United States Patent [19]

Kato et al.

[11] Patent Number: 4,676,596

[45] Date of Patent: Jun. 30, 1987

[54] OPTICAL DEVICE AND DOCUMENT READER USING THE SAME

[75] Inventors: Makoto Kato, Tokyo; Mitsuo Togashi, Kanagawa, both of Japan

[73] Assignees: Matsushita Electric Industrial Co., Ltd., Osaka; Matsushita Graphic Communication Systems, Tokyo, both of Japan

[21] Appl. No.: 666,892

[22] Filed: Oct. 31, 1984

[30] Foreign Application Priority Data

Oct. 31, 1983 [JP] Japan ................. 58-204032
Oct. 31, 1983 [JP] Japan ................. 58-204033
Oct. 31, 1983 [JP] Japan ................. 58-204034

[51] Int. Cl.⁴ .................... G02B 26/10; G03B 33/00
[52] U.S. Cl. ................... 350/167; 350/311; 354/102; 250/578
[58] Field of Search ................ 350/167–169, 350/311, 313, 317; 358/332–334; 369/125; 365/127; 250/226, 578; 354/102

[56] References Cited

U.S. PATENT DOCUMENTS

| | | | |
|---|---|---|---|
| 3,447,438 | 6/1969 | Kaufer et al. | 350/167 |
| 3,580,675 | 5/1971 | Hieber | 350/167 |
| 3,592,542 | 7/1971 | Kaufer et al. | 350/167 |
| 4,007,985 | 2/1977 | Yevick | 354/102 |
| 4,111,695 | 9/1978 | Yevick | 350/167 |
| 4,383,170 | 5/1983 | Takagi et al. | 250/578 |

Primary Examiner—John K. Corbin
Assistant Examiner—Loha Ben
Attorney, Agent, or Firm—Burgess, Ryan & Wayne

[57] ABSTRACT

In an optical device, small lenses are arranged in two or more rows to constitute a lens array, a plurality of such lens arrays are superimposed with each other between first and second planes, the distance between the optical axes of the rows of small lenses in at least one lens array is set to be different from that in the remaining lens arrays, and a multiple image of an optical image on the first plane is formed on an imaging surface. The distance between the optical axes can be changed by shifting the optical axis of one lens array among a plurality of small lenses forming one imaging system in the lens arrays from those of remaining lenses. The direction and amount of such lens offset are properly selected to suppress moiré. Another important invention concerns a document reader having a lens system of such an optical device, a line image sensor having tricolor separation filters arranged in the imaging surface in the horizontal scanning direction in correspondence with picture elements, and filters arranged in the optical paths of corresponding rows of small lenses of the lens arrays and capable of transmitting light of corresponding colors. A multiple image is a double image or a triple image. Moiré and color misregistration are prevented, and an image quality substantially equivalent to a color system having a plurality of color separation imaging surfaces is obtained.

13 Claims, 45 Drawing Figures

OPTICAL DEVICE AND DOCUMENT READER USING THE SAME

BACKGROUND OF THE INVENTION

The present invention relates to an optical device suitably adapted for an image reading optical system such as a facsimile system, and to a document reader using such an optical device.

One of major technical problems to be solved in scanning and photoelectrically converting an image using a one- or two-dimensional solid-state image sensor such as a CCD image sensor is suppression of the moiré of a scanned image.

Figure 1A:
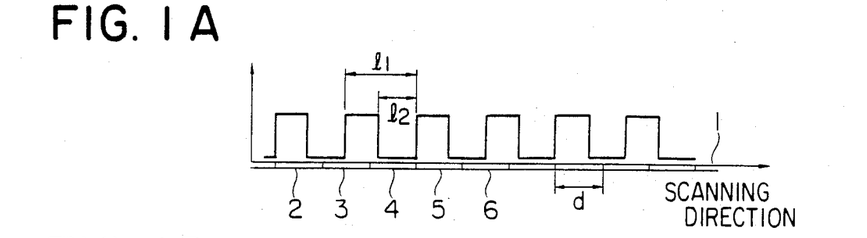
FIG. 1A shows the waveform of a sinusoidal pattern of the incident light in correspondence with openings corresponding to picture elements of a solid-state image sensor.
Figure 1B:
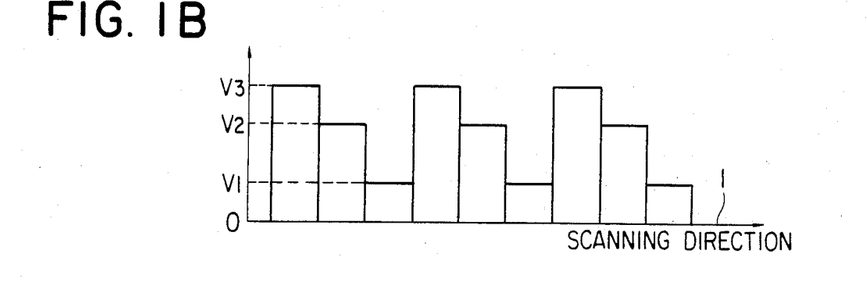
FIG. 1B shows the waveform of a photoelectric conversion output for each picture element of the solid-state image sensor corresponding to the input of the sinusoidal pattern of the incident light.

FIGS. 1A and 1B show waveforms for explaining how a moiré is generated. FIG. 1A shows the relationship between openings 2, 3, 4, 5, 6 etc. on an imaging surface 1 of a solid-state image sensor corresponding to picture elements, and the waveform of a sinusoidal pattern of the incident light on the imaging surface 1 and having a pitch $l_1 \approx 2l_2$ (where $l_2$ is a black interval). In this case, if the opening sensitivity distribution is assumed to be uniform, the photoelectric conversion output of each picture element of the solid-state image sensor has a moiré in which a very strong contrast of three times or more between a maximum value $V_3$ and a minimum value $V_l$ is generated, as shown in Fig. 1B. Note that reference symbol d denotes a picture-element pitch.

In order to suppress such a moiré, it is effective to form on the imaging surface a double or multiple image whose components are shifted along the scanning direction.

Figure 2A:
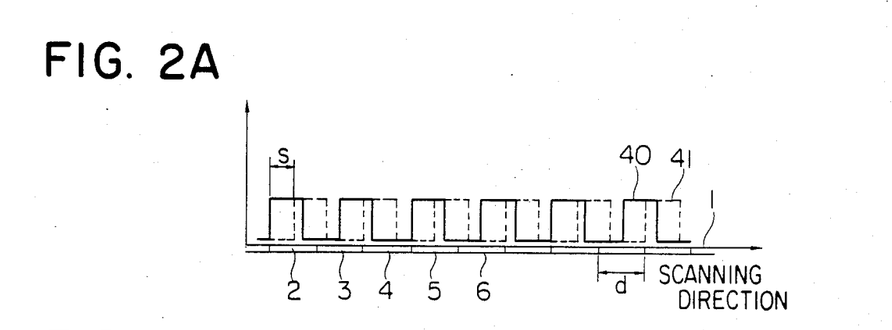
FIG. 2A shows the waveforms of the sinusoidal pattern of the incident light which are displaced relative to each other by an amount corresponding to half the picture-element pitch along the scanning direction by the solid and dotted lines.
Figure 2B:
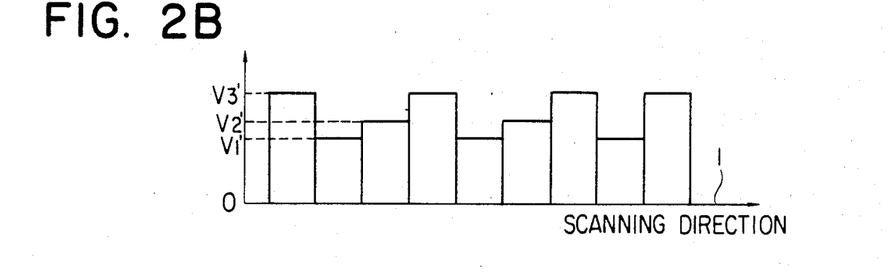
FIG. 2B shows the waveform of a photoelectric conversion output of each picture element of a solid-state image sensor for the sinusoidal pattern of the incident light.

FIGS. 2A and 2B show waveforms demonstrating the moiré suppression effect obtained when a double image is formed and are similar to FIGS. 1A and 1B. Referring to FIG. 2A, the solid line and the dotted line respectively show waveforms of a sinusoidal pattern of the incident light which is shifted by a displacement S corresponding to half the picture element pitch d in the scanning direction. FIG. 2B shows the photoelectric conversion output of each picture element of the solid-state image sensor when such a double image is formed on the imaging surface 1. Thus, the moiré contrast is reduced. The magnitude of the displacement of the double image must be determined in accordance with an image pattern to be processed, a desired resolution, or the like.

In order to form such a double image, a method is adopted wherein a quartz plate is inserted in front of the projection plane of the optical system, i.e., the imaging surface, and a double image having components with a predetermined displacement is formed utilizing the birefringence of the quartz plate.

In another method, a number of rod lenses of focusing light guides are arranged along the scanning direction to form rod lens rows. Light rays reflected from a document or the like are divided by these two rod lens arrays so as to form a double image having components with a predetermined displacement on an imaging surface of a sensor.

In the former method, when a contact-type image sensor (a relatively large image sensor) is used, in order to form on the imaging surface of the contact-image sensor an erect image of equal size to the original, a large quartz plate is required and the cost of the optical system is increased. In the latter method, the displacement of the two image components must be controlled precisely. For this reason, stability in precision is poor, and the device becomes expensive.

Figure 3:
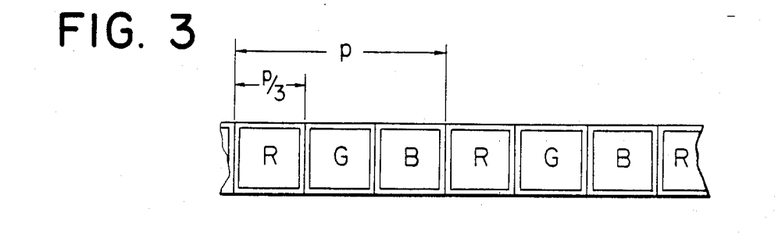
FIG. 3 is a plan view showing an arrangement of tricolor separation filters of a color image reading line image sensor.

Various proposals have recently been made to provide a color image sensor. FIG. 3 shows a plan view showing a typical arrangement of color separation filters mounted on the imaging surface of a color image reading line image sensor. A number of openings are formed on the imaging surface at a rate of three per picture element and at a pitch of p/3. Red, green and blue transmission filters R, G and B are arranged on the respective openings in the order shown in FIG. 3. An image is separated into three colors by these filters and is read.

Figure 4:
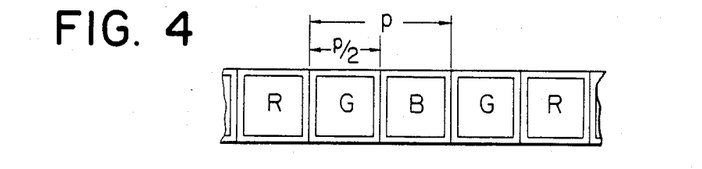
FIG. 4 is a plan view showing another arrangement of tricolor separation filters of a color image reading line image sensor.

FIG. 4 is plan view showing another arrangement of tricolor separation filters mounted on the imaging surface of a line image sensor. In this case, a number of openings are formed at a rate of two per picture element, and the respective color transmission filters are arranged at a pitch of p/2 in the order of R, G, B, G, R, G, B, G, and so on.

In such a line image sensor, when a black-and-white pattern is imaged using an imaging means such as a focusing rod lens array in an imaging surface, a color misregistration is caused in addition to a moiré, and the image quality is significantly degraded.

Figure 5A:
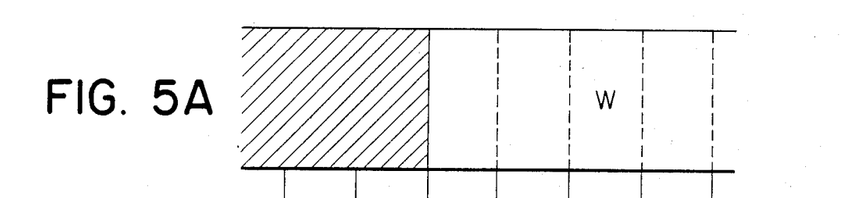
FIGS. 5A to 5C are illustrations for explaining the color misregistration caused when a conventional color image reading optical system is used.
Figure 5B:
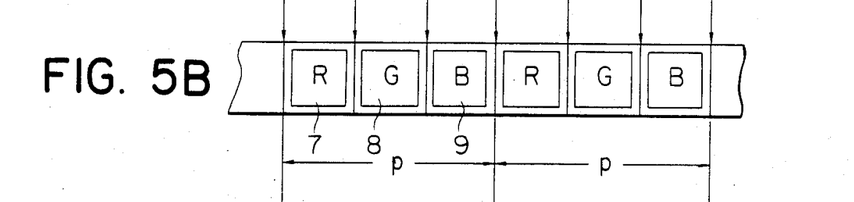
Figure 5C:
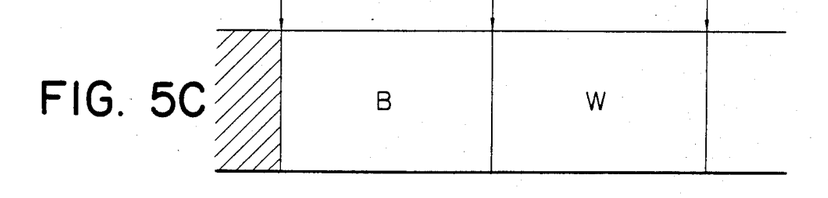

FIGS. 5A to 5C are illustrations for explaining misregistration. Assume a case wherein an erect image equal in size to a document consisting of a white region (denoted by W) and a black region (hatched region) connected in the horizontal scanning direction is formed on the imaging surface of a line image sensor shown in FIG. 5B. An image reproduced in accordance with a reading output from the line image sensor is shown in FIG. 5C. Referring to FIG. 5C, a blue region (denoted by B) of one picture-element width is formed at the boundary between a white region (denoted by W) and a black region (hatched region). This is caused by the following. Of openings 7, 8 and 9 of the line image sensor corresponding to the boundary between the black and white regions of the document, only the opening 9 receives light (white light). Thus, this portion produces an output which is the same as that obtained from a blue image.

Although the above description is made with reference to the case of a line image sensor having the filter arrangement shown in FIGS. 1A and 1B, the same applies to the case of a line image sensor having the filter arrangement shown in FIGS. 2A and 2B.

In order to prevent color misregistration and the moiré in a camera tube such as a television camera, a quartz plate is arranged in front of the imaging surface of an image sensor as described above, and a double image of an incident image is formed by the birefringence of the quartz plate. This can be also performed by the tricolor tube method.

However, in the former method, the resolution characteristics are degraded considerably, and misregistration is still not sufficiently prevented. It is therefore difficult to apply this method to a document reader such as a facsimile system, which must be capable of producing details of an image in the form of a hard copy. In the case of a contact-type document reader where an erect image equal in size to a document is formed on a line image sensor, a very large quartz plate corresponding to a maximum read width is required. However, such a big quartz plate is expensive, thus increasing the overall cost of the device.

In the latter method, since the number of image sensors is increased, this also increases the cost of the device.

SUMMARY OF THE INVENTION

The present invention has been made accounting the above-mentioned shortcomings and has been made as its first object to provide a stable and relatively inexpensive optical device which can be suitably adapted for forming double or a multiple erect image of equal size as that of an object on an imaging surface of a large image sensor.

It is a second object of the present invention to provide a document reader which uses the above-mentioned optical device and which can satisfactorily prevent color misregistration and is less in cost.

According to the first invention of this application, a plurality of two-dimensional lens arrays each consisting of a plurality of rows of small lenses are arranged to be superimposed with each other between a first plane (e.g., a surface of a document) and a second plane (e.g., an imaging surface of a large sensor). The distance between the optical axes of the small lenses of rows in at least one lens array is set to be different from that of the remaining lens arrays. The distance between the optical axes can be set to be different along the row direction of the small lenses or in a direction perpendicular to the row direction of the small lenses. When such a difference between the distances between the optical axes of the small lenses is properly selected and the displacement between the two image components of a double image is set to be a predetermined value, the moiré can be effectively suppressed.

According to the second invention of this application, there is provided a document reader wherein a multiple image of an optical image can be formed, on the imaging surface of a line image sensor of a document reader on which tricolor separation filters are arranged, by a lens system comprising a number of lens arrays in each of which a number of small lenses are arranged along the horizontal scanning direction to form at least two rows of small lenses, and a filter capable of transmitting light of only one color is inserted in the optical path of each optical image component constituting this multiple image, so that generation of moiré is prevented and color misregistration of a color image prevented. Thus, a document reader can be realized wherein, for example, a triple image of a document is formed as the multiple image using lens arrays each having three rows of small lenses, and a filter capable of transmitting light of only single color is inserted in the optical path of each image component so that generation of moiré is prevented and color misregistration is prevented. Furthermore, another document reader can be realized wherein, for example, a double image of a document is formed as an optical image using lens arrays each having two rows of small lenses, and a green transmitting filter and a magenta transmitting filter are respectively inserted in the optical paths of the two image components, so that the generation of moiré and color misregistration are prevented and the reader is less in cost.

The above and other objects, features and advantages of the present invention will become apparent from the following detailed description taken in conjunction with the accompanying drawings.

BRIEF DESCRIPTION OF THE DRAWINGS

FIGS. 1A and 1B show waveforms for explaining how a moiré is generated in an optical device, in which

FIGS. 2A and 2B show waveforms for explaining suppression of moiré upon formation of a double image, in which

DETAILED DESCRIPTION OF THE PREFERRED EMBODIMENTS

Figure 6:
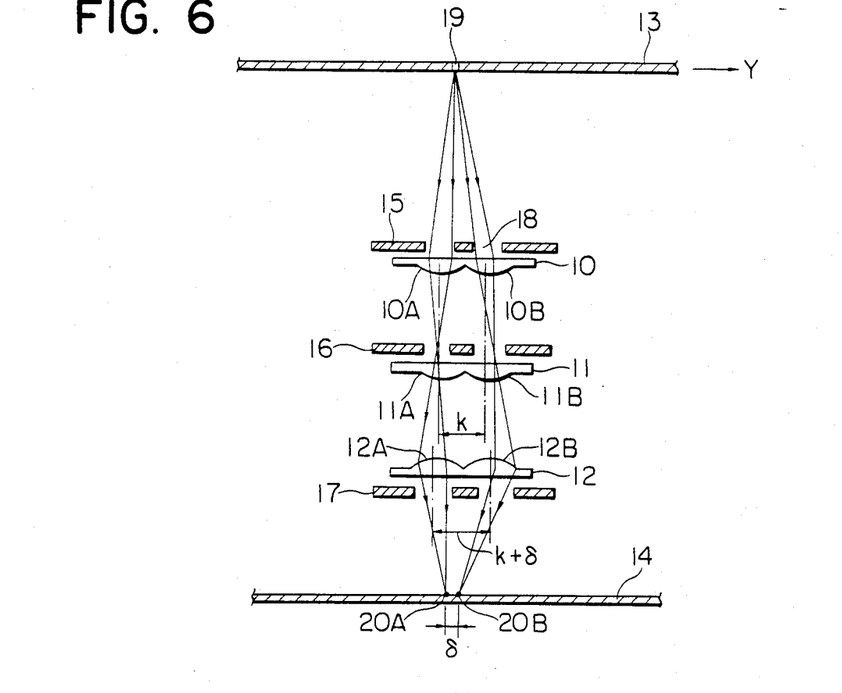
FIG. 6 is a sectional view schematically showing an optical device according to an embodiment of the first invention of this application.

FIG. 6 is a sectional view schematically showing an optical system according to a first embodiment of the first invention of this application. Referring to FIG. 6, reference numerals 10, 11 and 12 denote two-dimensional lens arrays which are interposed between a plane of a document 13 and an imaging surface of a large sensor 14. The lens arrays 10, 11 and 12 extend along a horizontal scanning direction X (perpendicular to the sheet of drawing). In each of these lens arrays 10, 11 and 12, two rows of a number of small convex lenses are arranged parallel to each other. Referring to FIG. 6, reference numerals 10A, 11A and 12A denote small convex lenses of a first row of the lens arrays 10, 11 and 12, respectively; and 10B, 11B and 12B, small convex lenses of a second row of the lens arrays 10, 11 and 12, respectively.

Reference numerals 15, 16 and 17 denote apertured stops for adjusting the amount of incident light and for suppressing flare and extend in the horizontal scanning direction X. Each stop 15, 16 and 17 has a number of apertures corresponding to the small lenses of the corresponding lens array 10, 11 or 12, respectively.

The mode of operation of the reader will be described. An erect image component of equal size to a point 19 on a document is formed on the imaging surface through the first and second rows of small convex lenses of the lens arrays 10, 11 and 12. A distance between the optical axes of the small convex lenses of the first and second rows of the lens array 12 is increased (k +δ) as compared to a distance k between the optical axes of the small convex lenses between the first and second rows of the lens arrays 10 and 11. Thus, the image components of the point 19 are formed at a point 20A on the imaging surface and on a point 20B thereon which is shifted from the point 20A by δ (displacement) in the vertical scanning direction. Thus, an erect double image of equal size to a document image is formed on the imaging surface. Therefore, when the displacement δ is properly selected, the moiré in the vertical scanning direction can be effectively suppressed.

The lens arrays 10, 11 and 12 as described above can be manufactured at low cost and high precision by a conventional plastic molding technique using a negative mold of a small convex lens group. Alternatively, the lens arrays 10, 11 and 12 can be manufactured by fixing small convex lens components in a number of apertures formed in a plate. However, when the high density of the small convex lenses and the manufacturing cost are considered, the former method is considered to be advantageous.

Positioning of the lens arrays 10, 11 and 12 can be performed by means of positioning projections at a high precision of about 10 μm in the same manner as that for the distance between the optical axes of small convex lenses. This positioning is far easier than the case wherein inclination of rod lens arrays is adjusted in an optical device, thus simplifying a mechanism for positioning and maintaining a high positioning precision over a long period of time.

According to a modification, the optical axes of the small convex lenses of any lens array 10, 11 and 12 may be offset from those of the small convex lenses of the remaining lens arrays in the horizontal scanning and vertical scanning directions to suppress the moiré in both the horizontal scanning and vertical scanning directions.

Figure 7:
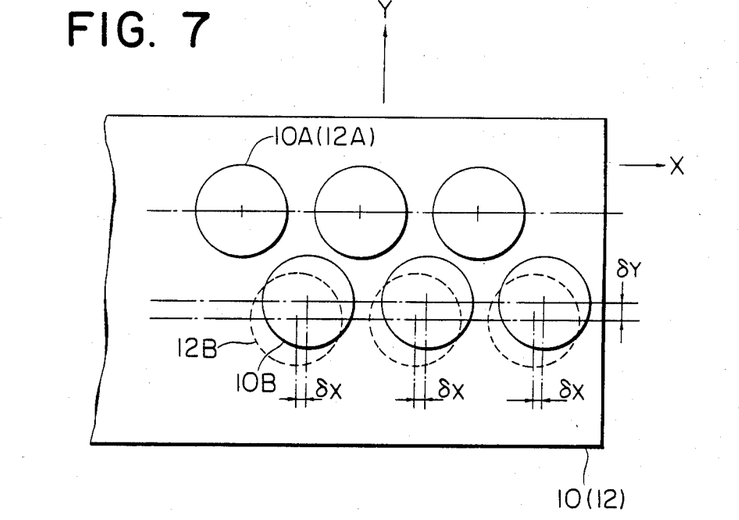
FIG. 7 is a view for explaining a modification according to the embodiment shown in FIG. 6.

FIG. 7 shows this modification. The small convex lenses 10A of the first row of the lens array 10 has the same pitch along the row direction as that of the small convex lenses 12A of the first row of the lens array 12. Therefore, the lenses of the first rows in the two arrays are vertically aligned. However, the small convex lenses 12B of the second row of the lens array 12 are offset from the small convex lenses 10B of the second row of the lens array 10 in the row direction by $\delta_Y$, and the distance between the first and second rows of the lens array 12 (distance between the optical axes of the lenses of the two rows) is increased by $\delta_X$. Therefore, the small convex lenses 12B are arranged as indicated by the broken lines in FIG. 7. Note that the lens pitch in the row direction is the same in each lens array, and that $\delta_X$ is the offset amount in the horizontal scanning direction and $\delta_Y$ is the offset amount in the vertical scanning direction.

Figure 8:
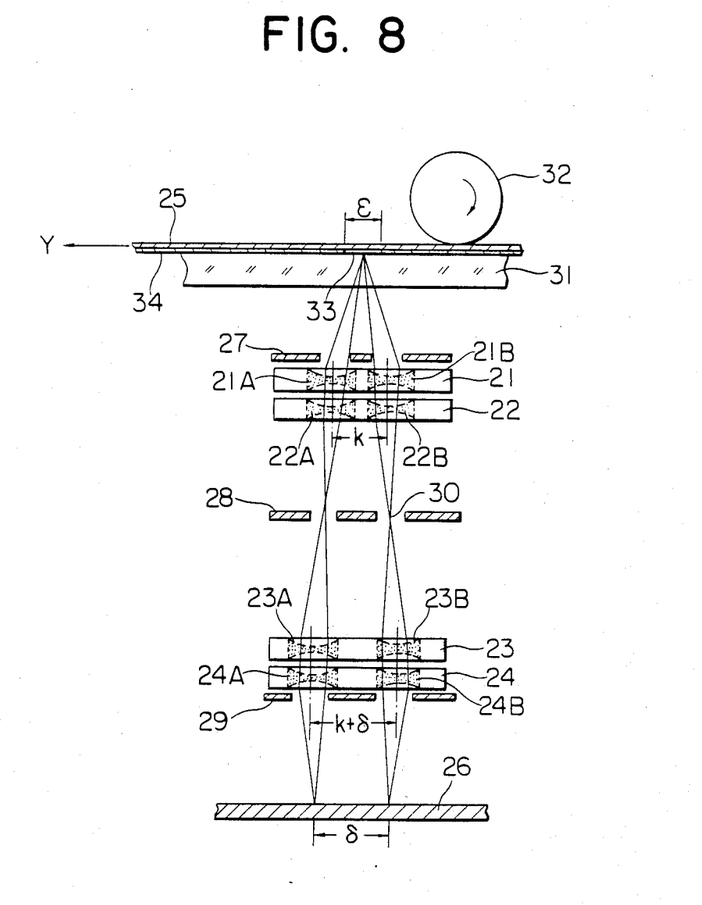
FIG. 8 is a sectional view schematically showing an optical device according to another embodiment of the first invention of this application.

FIG. 8 is a schematic view schematically showing an optical device according to the second embodiment of the first invention of this application. Reference numerals 21, 22, 23 and 24 are completely two-dimensional lens arrays without any projections or recesses, and are interposed between a plane of a document 25 and an imaging surface of a large image sensor 26. These lens arrays 21, 22, 23 and 24 extend along the horizontal scanning direction X (perpendicular to the sheet of drawing). In each lens array 21, 22, 23 or 24, two rows of a number of small graded index type convex lenses are formed integrally in an inner surface of a flat glass plate by diffusing a substance having a refractive index different from that of the plate from its surfaces. Referring to FIG. 8, reference numerals 21A, 22A, 23A and 24A denote graded index type lenses of the first rows of the lens arrays 21, 22, 23 and 24, respectively; and 21B, 22B, 23B and 24B, graded index type lenses of the second rows of the lens arrays 21, 22, 23 and 24, respectively.

Reference numerals 27, 28 and 29 denote apertured stops for adjusting the amount of incident light and for suppressing moiré and extend along the horizontal scanning direction X. Each stop 27, 28 or 9 has a number of apertures 30 corresponding to the small lenses of the lens array 21, 22, 23 or 24. The document 25 is fed by a document feeding roller 32 on a glass plate 31 in a vertical scanning direction Y. The upper surface of the glass plate 31 is covered with a deposition film 34 of a wear-resistant material such as chromium except for the portion of a document reading slit 33.

As in the case of the embodiment shown in FIG. 6, erect image components of equal size to a point on the document are formed on the imaging surface through the first and second rows of small convex lenses of the lens arrays 21, 22, 23 and 24. A distance between the optical axes of the small convex lenses of the first and second rows of the lens arrays 23 and 24 is increased (k +δ) as compared to a distance k between the optical axes of the small convex lenses between the first and second rows of the lens arrays 21 and 22. Thus, the image components of the point are formed at two points which are shifted by δ (displacement) in the vertical scanning direction. Thus, an erect double image of equal size to a document image is formed on the imaging surface. Therefore, when the displacement δ is properly selected, the moiré in the vertical scanning direction can be effectively suppressed.

An improvement over the conventional optical device obtained with the embodiment shown in FIG. 6 can be obtained with this embodiment. This embodiment can also be modified as in FIG. 7.

The focal length of the small lenses of each lens array, the aperture diameter, the distance between the respective lens arrays, the positions of the apertured stops and the like in each embodiment can be easily determined in accordance with an intended application of an optical device in accordance with a conventional measurement technique taking geometrical optics and wave optics into consideration.

Figure 9:
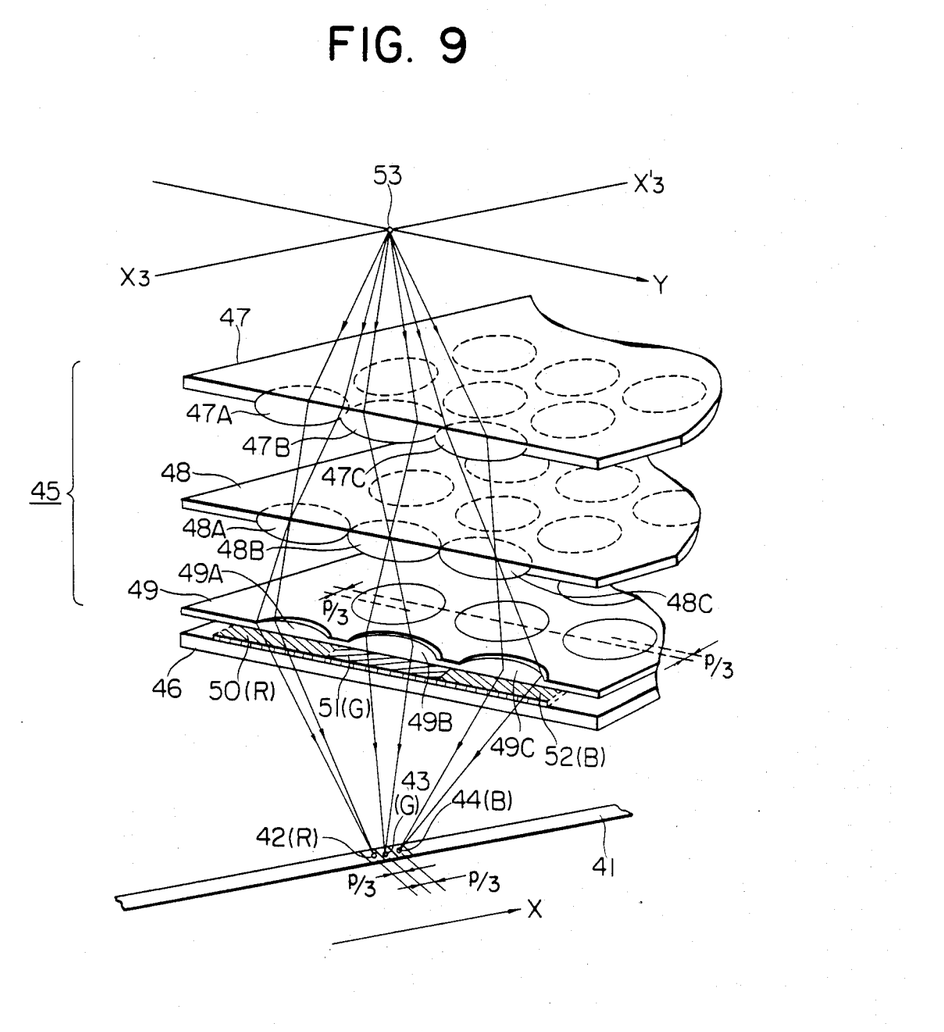
FIG. 9 is a perspective view schematically showing an optical system of a document reader according to a first embodiment of the second invention of this application.

FIG. 9 is a perspective view schematically showing a document reader according to a first embodiment of the second invention. Referring to FIG. 9, reference numeral 41 denotes a line image sensor. Openings 42, 43 and 44, . . . are aligned in the imaging surface of the sensor 41 along the horizontal scanning direction X. Three color separation filters shown in FIG. 3 are formed on the imaging surface. Reference numeral 45 denotes a lens system for forming a triple erect image of equal size along a scanning line $X_3$-$X_3'$ in the document image surface; and reference numeral 46 denotes a filter plate.

The lens system 45 comprises three two-dimensional lens arrays 47, 48 and 49. In each of the lens arrays 47, 48 and 49, a number of small convex lenses are formed on a plate and are aligned along the horizontal scanning direction X so as to constitute three rows. Reference numerals 47A, 48A and 49A denote small convex lenses of first rows, respectively; 47B, 48B and 49B, small convex lenses of second rows, respectively; and 47C, 48C and 49C, small convex lenses of third rows, respectively. The vertically corresponding small lenses of the second rows of the lens arrays 47, 48 and 49 have the identical optical axes. For example, a point image 53 on the scanning line $X_3$-$X_3'$ is focused by the small lenses of the second rows to form a green erect image of equal size in the opening 43 corresponding to a picture element of the line image sensor 41. The small lenses of the first and third rows of at least one lens array are offset by p/3 in a direction opposite to the horizontal scanning direction and in the horizontal scanning direction with respect to the second row of this lens array, so that the point image 53 is focused to form an erect image of equal size in the red opening 42 through the small lenses of the first rows and is focused to form an erect image of equal size in the blue opening 44 through the small lenses of the third rows.

The filter plate 46 has a red transmission filter 50 arranged to be parallel to the small lenses of the first row of the lens array 49, a green transmission filter 51 arranged to be parallel to the small lenses of the second row thereof, and a blue transmission filter 52 arranged to be parallel to the small lenses of the third row thereof.

Figures 10A, 10B:
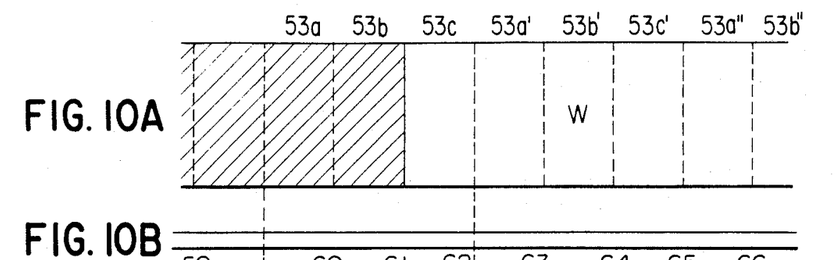
FIGS. 10A to 10D are illustrations for explaining the effect of preventing color misregistration in the embodiment shown in FIG. 9.
Figure 10C:
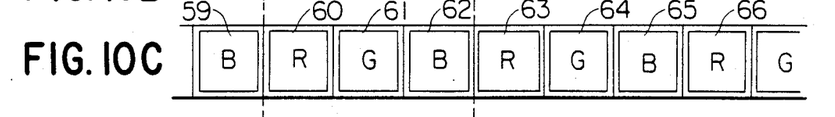
Figure 10D:
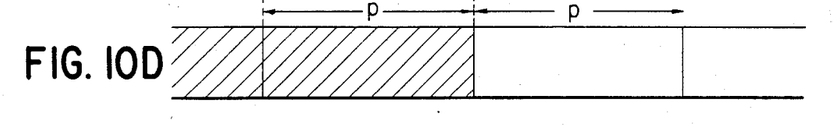
Figures 11A, 11B:
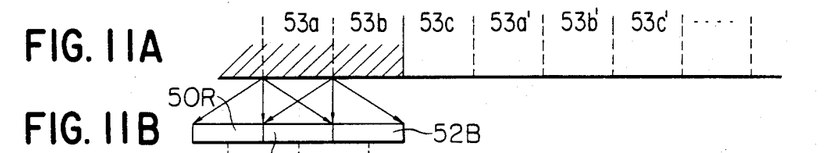
FIGS. 11 to 17 are microscopic illustrations for explaining the principles involved in preventing color misregistration.
Figure 11C:
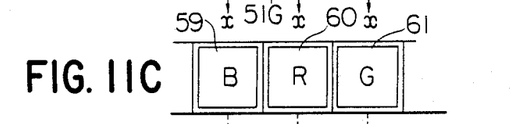
Figure 11D:
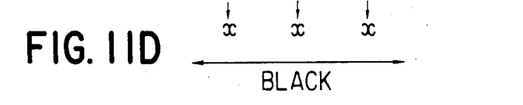
Figures 12A, 12B:
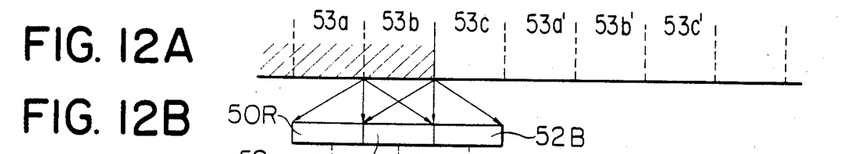
Figure 12C:
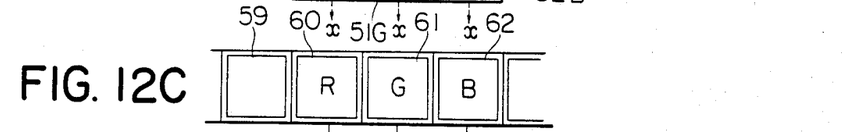
Figure 12D:
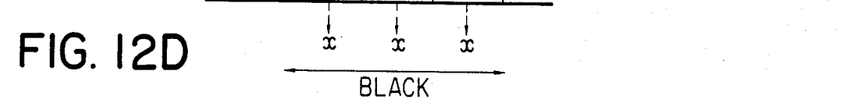
Figures 13A, 13B:
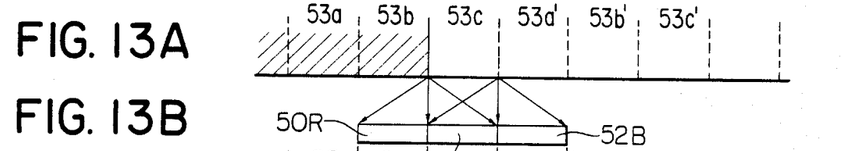
Figures 13C, 13D:
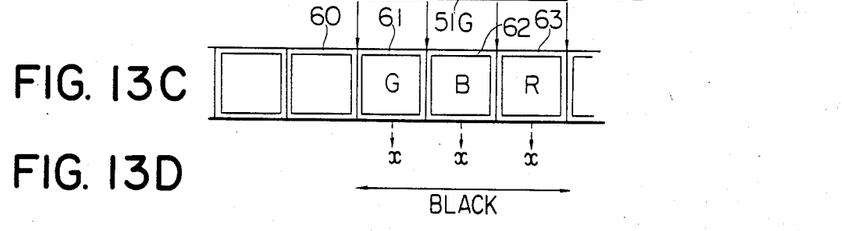
Figures 14A, 14B:
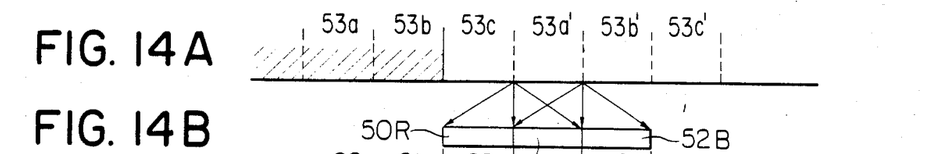
Figure 14C:
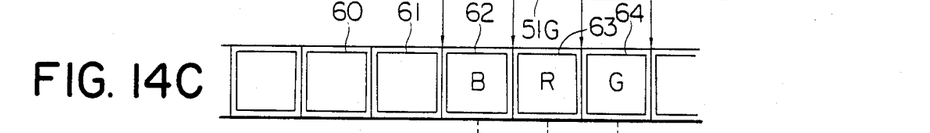
Figure 14D:
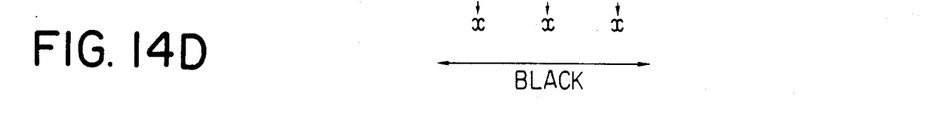
Figure 15A:
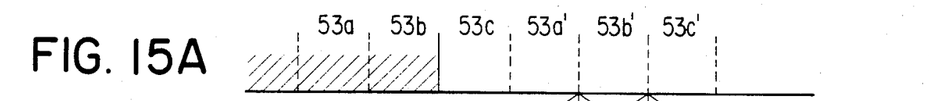
Figures 15B, 15C:
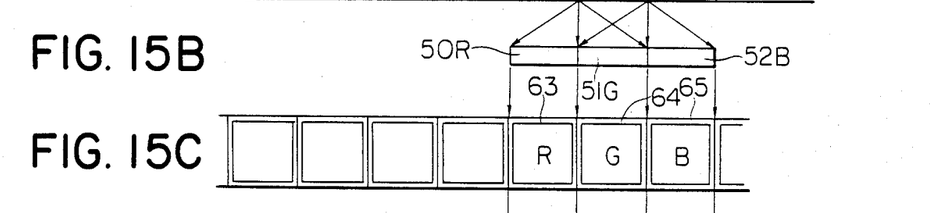
Figure 15D:
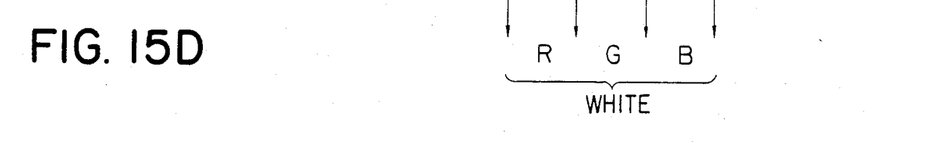
Figure 16A:
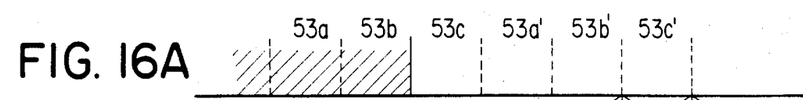
Figure 16B:
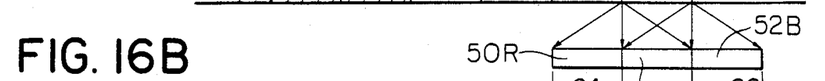
Figure 16C:
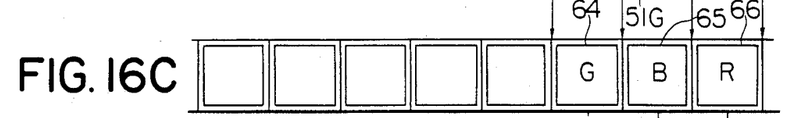
Figure 16D:
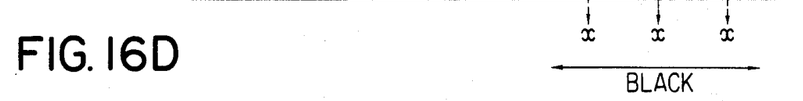

With the arrangement described above, color misregistration can be prevented. For example, when a document image (FIG. 10A) having a black region (hatched portion) and a white region (represented by W) which are continuous along the horizontal scanning direction X is focused at illustrated positions (FIG. 10C) of the openings of the imaging surface of the line image sensor 41 through the lens system 45 and the filters 50 to 52 shown in FIG. 10B, openings 60 to 62 receive only light components which are not transmitted through the corresponding filters, and outputs through these openings 60 to 62 represent a black state. Openings 63 to 65 receive light components passing through the corresponding filters, so that outputs through the openings 63 to 65 represent a white state. Therefore, an image reproduced by the output from the line image sensor is shown in FIG. 10D. Unlike the conventional reader, a blue portion is not formed at the boundary between the black and white portions.

The above effect is not limited to the above embodiment, but can be extended for a document image having any pattern and any color distribution. The adjacent red, blue and green openings in the imaging surface of the line image sensor generate signals obtained by tricolor separating a dot image. As a result, color misregistration in a tricolor tube television camera can be prevented.

The effect of FIGS. 10A to 10D will be described in detail with reference to FIGS. 11A to 17. Referring to FIGS. 11A to 16D, each of FIGS. 11A, 12A, 13A, 14A, 15A and 16A shows a document image surface. Portions 53a, 53b and 53c constitute one picture element. The next picture element is constituted by portions 53a', 53b' and 53c'. Each of FIGS. 11B, 12B, 13B, 14B, 15B and 16B shows a transmission filter. Reference numeral 50R denotes a filter for transmitting red light; and 51G and 52B, filters for transmitting green light and blue light, respectively. The image output is gotten only when these tricolor filters are arranged such that the green filter 51G is located immediately under the point to be read, as shown in FIG. 9. Therefore, although the three filters 50R, 51G and 52B are illustrated as if they are actually displaced, as shown in FIGS. 11A to 16D, they are actually fixed in position. The positions in FIGS. 11B, 12B, . . . and 16B are given for illustrative convenience so as to explain reading at the respective points. Each of FIGS. 11C, 12C, . . . and 16C shows the filter on the line image sensor. The filters 50R, 51G and 52B are fixed on the line image sensor at a pitch of p/3. Each of FIGS. 11D, 12D, . . . and 16D shows the output state of the read point.

FIGS. 11A to 11D show reading of light emitted from one point 53a. The light from the point 53a is focused by the optical system of this embodiment at three points 59, 60 and 61. However, the light from the point 53a represents the "black" state and will not be transmitted by any filter shown in FIG. 11B. Therefore, a sensor output represents the "black" state.

FIGS. 12A to 12D show reading of light emitted from one point (black) 53b. In this case, this light is not transmitted through any transmission filter in FIG. 12B, so that an image sensor output represents the "black" state.

FIGS. 13A to 13D show reading of light emitted from one point (white) 53c. In this case, since the light represents the "white state", R, G and B transmitted light components in an order named are filtered through the corresponding transmission filters shown in FIG. 13B. However, the filter components in FIG. 13C only transmit the G, B and R components in the order named. As a result, the image sensor will not generate any output (this represents the "black" state).

FIGS. 14A to 14D show reading of light emitted from one point 53a' in the next picture element. Since the light from the point 53a' represents the "white" state, R, G and B components in the order named are transmitted through the transmission filters in FIG. 14B. However, filters 62, 63 and 64 located at the imaging points transmit B, R and G components in the order named, so that no output is generated from the image sensor.

FIGS. 15A to 15D show reading of light emitted from one point (white) 53b'. R, G and B components in the order named are transmitted through the transmission filter components in FIG. 15B. Since corresponding filter components 63, 64 and 65 transmit R, G and B components in the order named, the image sensor generates a one-pitch image sensor picture-element output which represents the "white" state.

FIGS. 16A to 16D show reading of light emitted from one point (white) 53c'. R, G and B components in the order named are transmitted through the transmission filter components shown in FIG. 16B. The corresponding filter components 64, 65 and 66 transmit G, B and R components in the order named, so that no output is generated from the image sensor.

Figure 17:
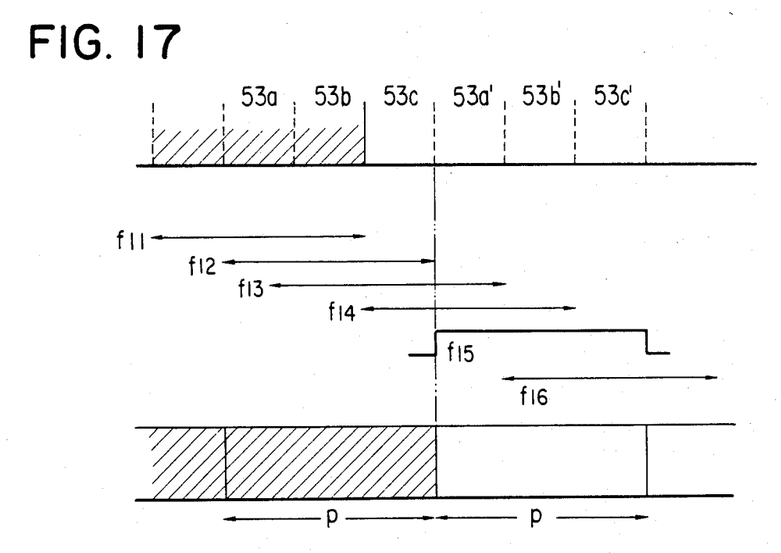

FIG. 17 shows all outputs shown in FIGS. 11A to 16D. For example, reference symbol F11 denotes a "black" output (the same output is obtained when no signal is generated) in FIGS. 11A to 11D. Reference symbol f15 denotes a "white" output. Although outputs f13 and f14 represent "black" outputs, respectively, as can be seen in association with an output f15, only a color output is obtained when the "black" outputs are obtained together with this color output. In fine, the black or white signal is obtained for every picture element (pitch p) of the image sensor.

As has been apparent from FIGS. 10A to 10D (FIG. 17), an undesirable color signal will not be generated. In other words, the so-called color misregistration phenomenon can be prevented. In addition, a read error can be decreased to ⅓ of the picture-element pitch P, thereby performing color reading with high precision.

The lens arrays 47, 48 and 49 are prepared by using a negative mold of small convex lenses with high precision and at low cost in accordance with a conventional plastic molding technique. Alternatively, small lenses may be fixed in openings formed in a plate, respectively. However, the former method is preferred in favor of the packing density and low fabrication cost.

In the above embodiment, the lens system 45 has three two-dimensional lens arrays. However, two lens arrays or four or more lens arrays may be used. In this case, when three or more lens arrays are used, aberration and a distance between the object and the image can be decreased.

Figure 18:
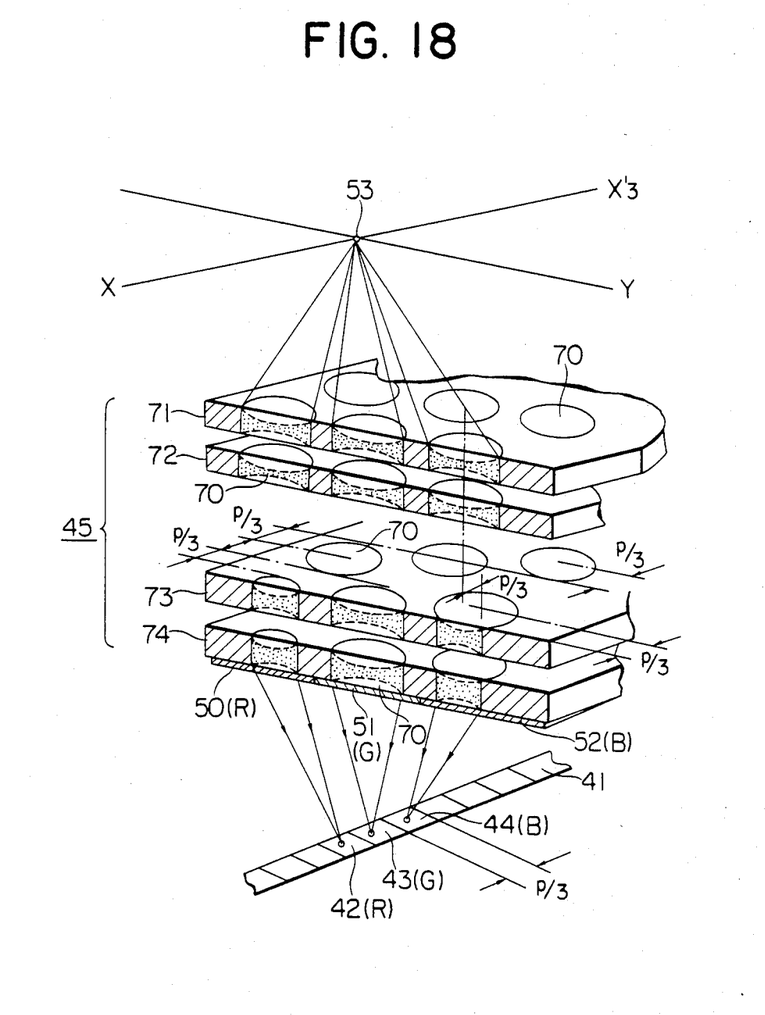
FIG. 18 is a perspective view schematically showing an optical system of a document reader according to a second embodiment of the second invention of this application.

FIG. 18 is a perspective view schematically showing a document reader according to a second embodiment of the second invention. According to this embodiment, a substance having a refractive index different from that of a flat glass plate is diffused from the surfaces of the flat glass plate to form small graded index type convex lenses 70 along the horizontal scanning direction X so as to constitute a lens array having three rows of lenses. A lens system 45 is obtained by using four two-dimensional lens arrays 71 to 74 obtained in this manner. Filters 50 to 52 are adhered to the lower surface of the lens array 74.

Other arrangements and the behavior of the lens system 45 and the filters 50 to 52 in this embodiment are the same as in the document reader of the first embodiment of the second invention.

Figure 19:
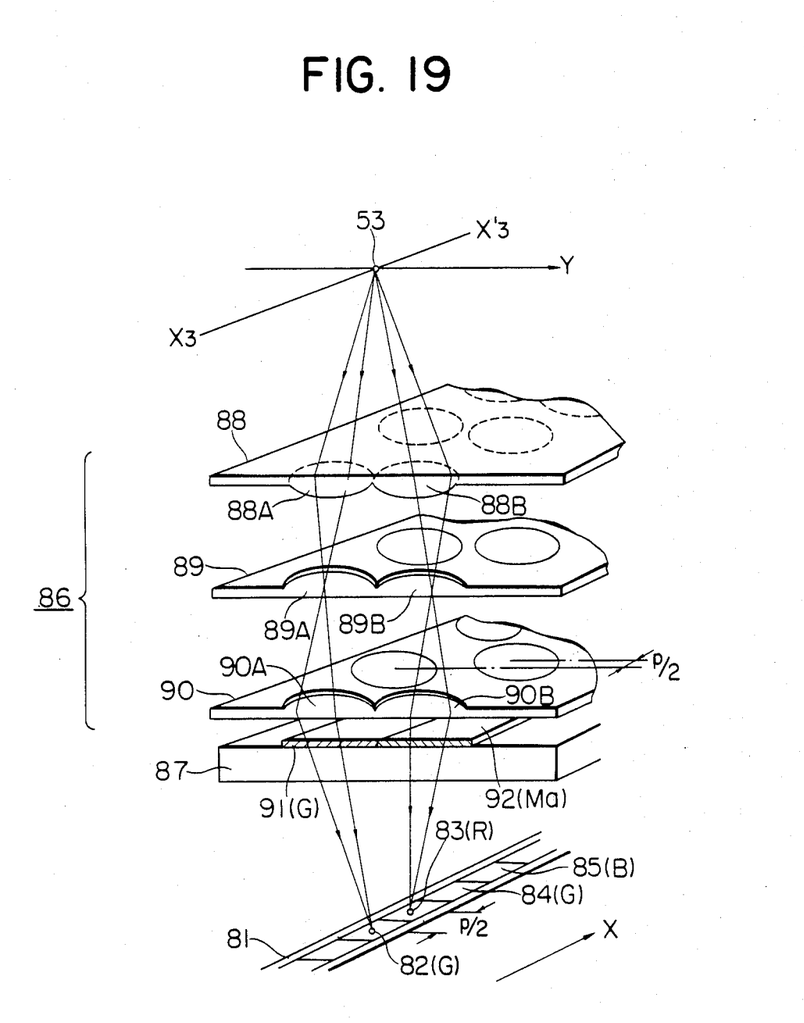
FIG. 19 is a perspective view schematically showing an optical system of a document reader according to a third embodiment of the second invention of this application.

FIG. 19 is a perspective view schematically showing a document reader according to a third embodiment of the second invention. Referring to FIG. 19, reference numeral 81 denotes a line image sensor. Openings 82, 83, 84, 85, . . . are formed in the imaging surface along the horizontal scanning direction X. Three color separation filters having the arrangement in FIG. 4 are formed on the openings 82, 83, 84, 85, . . . in the imaging surface. Reference numeral 86 denotes a lens system for focusing a double image on the scanning line $X_3$-$X_3'$ on the document image surface to form an erect image of equal size. Reference numeral 87 denotes a filter plate.

The lens system 86 comprises three two-dimensional lens arrays 88, 89 and 90. Each of the lens arrays 88, 89 and 90 has a number of small convex lenses aligned on a plate along the horizontal scanning direction X so as to constitute two rows. Reference numerals 88A, 89A and 90A denote small convex lense of a first rows, respectively; 88B, 89B and 90B, small convex lenses of a second row, respectively. The optical axes of the small lenses of the second row (or the first row) on the lens array 90 are offset by p/2 (p/3 in the case of the filter arrangement in FIG. 3) from those of the small lenses of the second rows of the lens arrays 88 and 89. Other vertically corresponding small lenses have the identical optical axes, respectively. When a point image 53 on the scanning line $X_3$-$X_3'$ on the document image surface is focused through the small lenses of the first row to form an erect image of equal size in an opening 82 of the line image sensor 81, the point image is also focused by the small lenses of the second row to form an erect image of equal size in the opening 83.

A green transmission filter 91 arranged parallel to the small lenses of the first row on the lens array 90, and a magenta (the complementary color of green) transmission filter 92 parallel to the small lenses of the second row are arranged in the filter plate 87.

With this arrangement, even if a document image shown in FIG. 5A is read, light is not transmited through one opening corresponding to a boundary of white and black of the document image pattern. In the same manner as in FIGS. 10A to 10D, color misregistration can be prevented.

The lens arrays 88, 89 and 90 are prepared by using a negative mold of small convex lenses with high precision and at low cost in accordance with a conventional plastic molding technique. Alternatively, small lenses may be fixed in openings formed in a plate, respectively. However, the former method is preferred in favor of the packing density and low fabrication cost.

In the above embodiment, the lens system 86 has three two-dimensional lens arrays. However, two lens arrays or four or more lens arrays may be used. In this case, when three or more lens arrays are used, aberration and a distance between the object and the image can be decreased.

The filters 91 and 92 may be directly formed by deposition or the like on the lens array.

Figure 20:
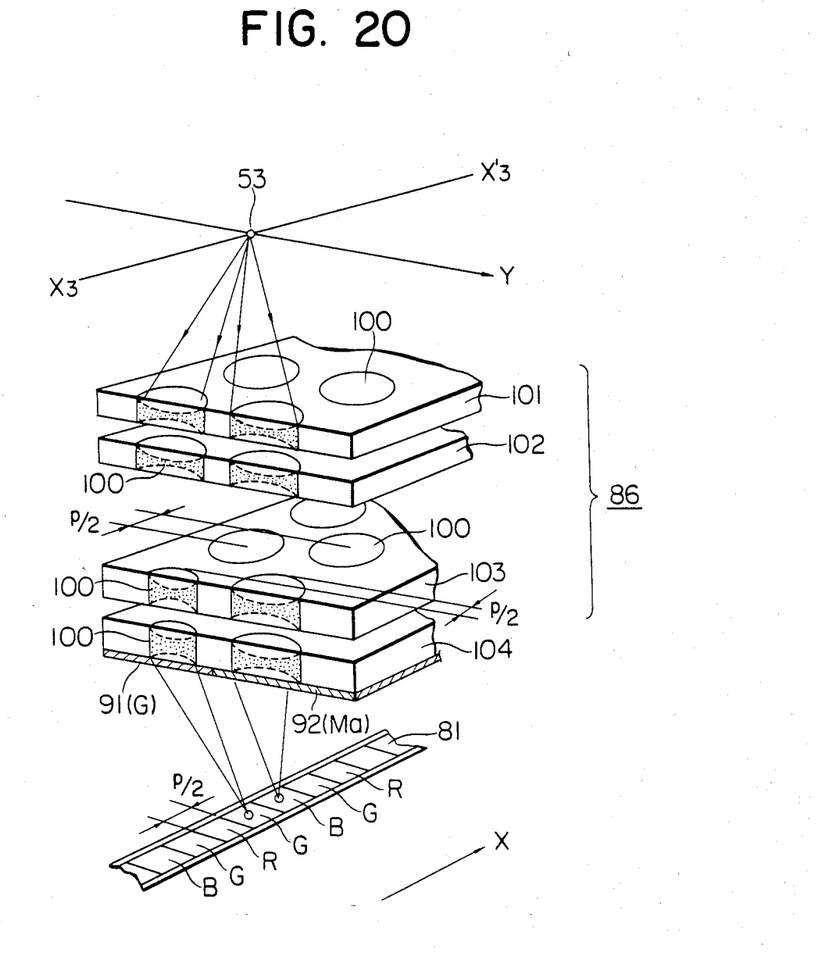
FIG. 20 is a perspective view schematically showing an optical system of a document reader according to a fourth embodiment of the second invention of this application.

FIG. 20 is a perspective view schematically showing a document reader according to a fourth embodiment of the second invention. According to this embodiment, a substance having a refractive index different from that of a flat glass plate is diffused from the surfaces of the flat glass plate to form small graded index type convex lenses 100 along the horizontal scanning direction X so as to constitute a lens array having three rows of lenses. A lens system 86 is obtained by using four two-dimensional lens arrays 101 to 104 obtained in this manner. Filters 91 and 92 are adhered to the lower surface of the lens array 104.

Other arrangements and the behavior of the lens system 86 and the filters 91 an 92 in this embodiment are the same as the third embodiment of the second invention.

For illustrative convenience throughout the first to fourth embodiments, optical components are omitted. However, the following components are used in the document reader: a white light source for illuminating a document surface image, a slit member arranged between the lens system and the document image, and an apertured stop arranged in the lens system so as to prevent degradation (flare) of the image which is caused by transmission of light between the lenses of the lens arrays and to obtain a uniform image intensity distribution.

What is claimed is:

1. An optical device comprising a plurality of two-dimensional lens arrays, each including at least two rows of substantially identical small lenses, said lens arrays being superimposed upon each other between a first plane and a second plane, said small lenses of respective rows being arranged at the same pitch with each other in a horizontal scanning direction, the small lenses of at least one row of at least one lens array being shifted respectively from lenses of other rows of said at least one lens array, said lenses of said other rows of said at least one lens array respectively having substantially common axes with corresponding lenses of other lens arrays, whereby multiple images of optical images on said first plane are formed on an imaging surface on said second plane.

2. An optical device according to claim 1, wherein axes of small lenses of an nth row of said at least one lens array are shifted from those of lenses of an nth row of the remaining lens arrays by $\delta_y$ in a vertical scanning direction, where $\delta_y$ is a distance between axes of corresponding small lenses of said at least one lens array and those of the remaining lens arrays in a vertical scanning direction Y.

3. An optical device according to claim 1, wherein a distance between adjacent rows of small lenses of said at least one lens array is different from that between adjacent rows of small lenses of said remaining lens arrays by $\delta_x$ in a horizontal scanning direction X, where $\delta_x$ is a distance between axes of corresponding small lenses of said at least one lens array and those of the remaining lens arrays in a horizontal scanning direction X.

4. An optical device according to claim 1, wherein axes of small lenses of an nth row of said at least one lens array are shifted from those of lenses of an nth row of the remaining lens array by $\delta_y$ in a vertical scanning direction, a distance between adjacent rows of small lenses of said at least one lens array is different from that between adjacent rows of small lenses of said remaining lens arrays by $\delta_x$ in a horizontal scanning direction X, where $\delta_y$ is a distance between axes of corresponding small lenses of said at least one lens array and those of the remaining lens arrays in a vertical scanning direction Y, and $\delta_x$ is a distance between axes of corresponding small lenses of said at least one lens array and those of the remaining lens arrays in a horizontal scanning direction X.

5. An optical device according to claim 1, wherein said first plane is one of: (a) a surface of a document and (b) an imaging surface of an image to be detected, and said second plane is an imaging surface of an image sensor.

6. An optical device according to claim 1, wherein each of said plurality of lens arrays comprises a group of integrally molded small convex lenses.

7. An optical device according to claim 1, wherein each of said plurality of lens arrays is formed such that the small lenses are formed integrally in a flat glass plate by diffusing a substance having a refractive index different from that of said glass plate from surfaces of said plate.

8. A document reader comprising a line image sensor wherein tricolor separation filters are arranged on an imaging surface thereof in a horizontal scanning direction in correspondence with picture elements; a plurality of lens arrays in each of which a plurality of small lenses are arranged along the horizontal scanning direction to form at least two rows of small lenses, positions of optical axes of the small lenses in said plurality of lens arrays being set such that a multiple image having components displaced by a predetermined amount in the horizontal scanning direction is formed on the imaging surface; and filters each arranged in an optical path of the rows of small lenses of each of said plurality of lens arrays, each filter for transmitting light of only a corresponding color, and said plurality of lens arrays being superimposed with each other along a direction of the optical axes of the small lenses, said small lenses of respective rows being arranged at the same pitch with each other in the horizontal scanning direction, the small lenses of at least one row of at least one lens array being shifted respectively from lenses of other rows of said at least one lens array, said lenses of said other rows of said at least one lens array respectively having substantially common axes with corresponding lenses of other lens arrays.

9. A document reader according to claim 8, wherein said plurality of lens arrays comprise a group of lens arrays in each of which a plurality of small lenses are arranged in the horizontal scanning direction to form three rows of small lenses, said group of lens arrays forming three images of a document on the imaging surface, the three images being shifted from each other by a predetermined distance in the horizontal scanning direction, and said filters comprise first to third filters which are arranged respectively in optical paths of the first to third rows of the small lenses so as to transmit light of first to third colors respectively.

10. A document reader according to claim 8, wherein said plurality of lens arrays comprise a group of lens arrays in each of which a plurality of small lenses are arranged in the horizontal scanning direction to form two rows of small lenses, said group of lens arrays forming double images of a document on the imaging surface, the double images being shifted from each other by a predetermined distance in the horizontal scanning direction, and a green transmitting filter and a magenta transmitting filter are respectively arranged in optical paths of the first and second rows of small lenses of said group of lens arrays.

11. A document reader according to claim 8, wherein each of said lens arrays is formed such that a group of small convex lenses are formed intergrally.

12. A document reader according to claim 8, wherein each of said lens arrays is formed such that a group of small convex lenses are formed integrally in an inner surface of a flat glass plate by diffusing a substance having a refractive index different from that of said plate from surfaces thereof.

13. A document reader comprising a line image sensor in which tricolor separation filters are arranged in a horizontal scanning direction in correspondence with picture elements; a plurality of lens arrays in each of which a plurality of small lenses are arranged in the horizontal scanning direction to form n rows of small lenses (where $n \geq 2$); and filters arranged in optical paths of the small lenses of the rows of said lens arrays and capable of transmitting light of only corresponding colors, wherein the distance between centers of adjacent lenses in first to nth rows of small lenses in at least one lens array among said plurality of lens arrays is set to be the same as that of first to nth rows of small lenses in the remaining lens arrays of said plurality of lens arrays, the small lenses of the nth row of said at least one lens array is offset from the small lenses of the nth row of the small lenses of said remaining lens arrays by p/m (where p is a picture-element pitch and m is the number of images) in a vertical scanning direction, and said plurality of lens arrays are superimposed with each other along the optical axes of the small lenses.

* * * * *